Figure 1:
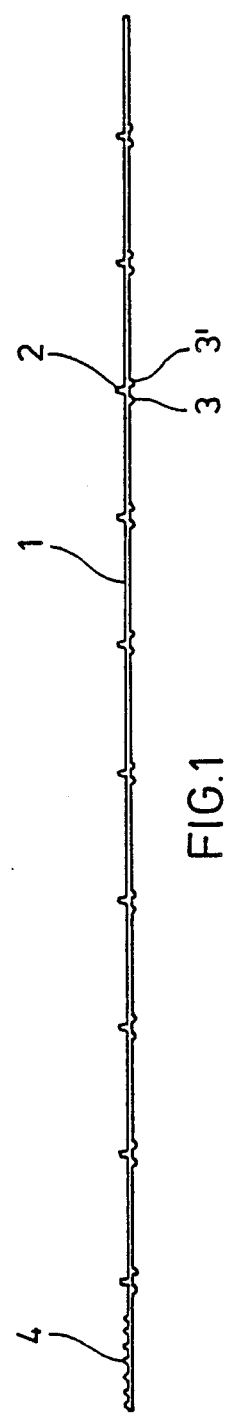

United States Patent [19]

Böhnstedt et al.

[11] Patent Number: 4,927,722
[45] Date of Patent: May 22, 1990

[54] SEPARATOR FOR STARTER BATTERIES

[75] Inventors: Werner Böhnstedt, Henstedt-Ulzburg; Werner Lindenstruth, Quickborn, both of Fed. Rep. of Germany

[73] Assignee: Grace G.m.b.H., Norderstedt, Fed. Rep. of Germany

[21] Appl. No.: 386,394

[22] Filed: Jul. 28, 1989

[30] Foreign Application Priority Data

Sep. 9, 1988 [DE] Fed. Rep. of Germany ....... 3830728
Feb. 10, 1989 [DE] Fed. Rep. of Germany ....... 3903977

[51] Int. Cl.$^5$ ............................................. H01M 2/18
[52] U.S. Cl. ..................................... 429/147; 429/143
[58] Field of Search ........................ 429/143, 146, 147

[56] References Cited

U.S. PATENT DOCUMENTS

| | | | |
|---|---|---|---|
| 963,284 | 7/1910 | Fitz | 429/143 |
| 2,066,939 | 1/1937 | Kershaw | 429/146 |
| 3,205,098 | 9/1965 | Hall et al. | 429/143 |
| 3,340,100 | 9/1967 | Silvestri | 429/143 |
| 3,917,772 | 11/1975 | Hollenbeck | 264/41 |
| 4,309,818 | 1/1982 | Kline | 29/623 |
| 4,384,031 | 5/1983 | Kline | 429/176 |

FOREIGN PATENT DOCUMENTS 1,269,212 5/1968 Silvestri et al. .
1,771,227 1/1964 Leinweber. .
3,117,917 3/1982 Manitz et al. .

*Primary Examiner*—Anthony Skapars
*Attorney, Agent, or Firm*—John D. Hubbard; William L. Baker

[57] ABSTRACT

In a separator made of elastic synthetic material for starter batteries, which has a sheet thickness of approx. 0.15 to 0.35 mm and solid ribs formed integrally on both sides from the synthetic material, such that on the front side of the separator facing the positive electric plate a number of ribs is arranged, the height of which is greater than the thickness of the separator sheet, while the ribs on the rear side of the separator facing the negative electrode plate have a smaller height than the ribs on the front side, there are ribs on the rear side each arranged offset to the ribs on the front side, such that a front-side rib runs between two rear-side ribs arranged as a pair, or a rear-side rib runs between two front-side ribs arranged as a pair, such that the distance between the two ribs arranged in a pair is considerbly smaller than the distance between the adjacent groups each formed of three associated ribs.

28 Claims, 3 Drawing Sheets

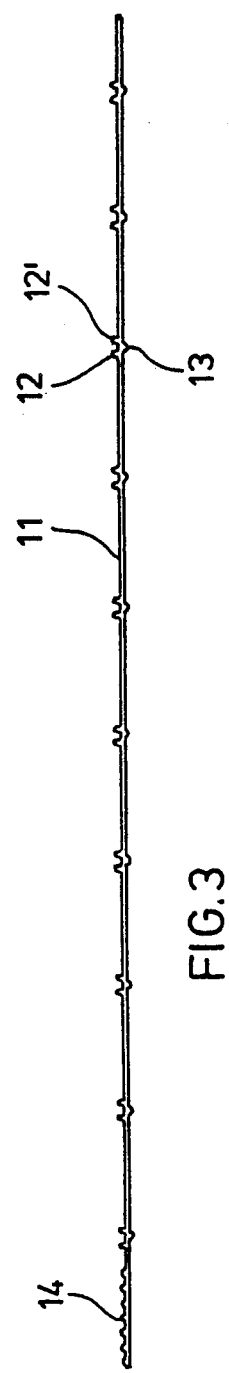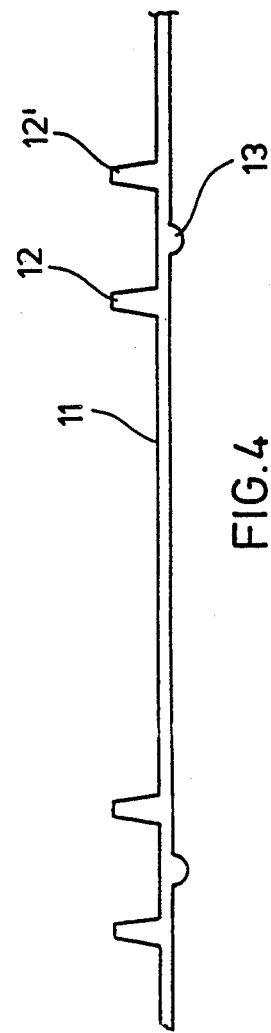

SEPARATOR FOR STARTER BATTERIES

The invention relates to a separator made of elastic thermoplastic material, which is inserted between the oppositely charged electrode plates of lead/sulphuric acid starter batteries. The microporous separator prevents short-circuits between the plates and the fall-out of plate material, and yet due to its porous structure it allows the ionic current flow in the electrolyte.

A normal starter battery consists of several cells, each of which contains a number of electrode plates and separators; there can be up to 20 plates and separators per cell. Due to the manufacturing tolerances the variations occurring in the thicknesses of the individual components, i.e. both of the electrode plates and of the battery separators, can add up, with the consequence that considerable variations in the pack thickness can occur. Previously, if the thickness of the pack was too small, this was compensated by inserting it with spacers into the cell divisions of the battery containers. This operation can only be carried out manually however, which is not possible with modern, fully automated lines, in which the electrode plates of one polarity, enclosed in pockets of the separator material, are stacked into packs with electrode plates of the other polarity and these are inserted mechanically into the battery containers.

Battery separators are known from DE-PS 12 69 212 with ribs of elastic-foam material, which can be pressed together slightly by making use of the compressibility of the ribs. However, because of the high resistance to deformation by pressure using such separators it is only possible to compensate for very small variations in thickness. In addition, because the manufacture of such ribs is only possible in an additional process stage by applying them subsequently to the separator sheet and foaming up the ribs, it is not possible for this to be integrated into modern manufacturing processes in which the separators are manufactured in roll form from thermoplastic material by extrusion and subsequent calendering.

In the DE-PS 17 71 227 separators for alkaline batteries are described which have ribs (spacers), which are punched out of a foil and then applied to the surface of a flexible separator foil and attached thereto. According to one embodiment the ribs are arranged so that they are staggered on both sides of the separator foil. Under pressure this type of separator between the electrode plates takes on a form similar to that of corrugated paper. The separator foil thus also comes into contact with the positive electrode plate and is therefore exposed to the danger of destructive oxidation. Due to the flexibility of the separator foil there is practically no restoring force. Moreover, this previously known battery separator also has the disadvantage that it can only be manufactured in a multi-stage process.

Also on the market are battery separators made of a synthetic-fibre fleece, with impress beads for reinforcement, which can be pressed out alternately from both surfaces. These beads act at the same time as spacers for the electrode plates in a similar way to the solid ribs in normal synthetic separators. When these are installed in batteries the usual compression pressure is only sufficient to press the beads together slightly; when on the other hand very high pressure is used the beads are pressed completely flat and the separator sheet lies directly on both electrode plates and consequently one cannot ensure an adequate acid supply to the electrodes. It is consequently also not possible to solve the problem with these separators made of fibre-fleece.

Another suggestion for the solution of this problem is known from DE-OS 31 17 917. According to this proposal flexible ribs are provided on the walls of the battery container, which act as elastic spacers when the plate pack is inserted. Manufacturing such battery containers is however extremely involved and complicated.

The battery separators made from thermoplastic synthetic material that are used to a great extent today for starter batteries to encase the electrodes have a sheet thickness of about 0.15 to 0.35 mm and have solid ribs integrally formed from the synthetic material. On the front side of the separator which faces the positive electrode plate a number of ribs is arranged, the height of which is greater than the thickness of the separator sheet. Should ribs also be arranged on the rear side of the separator which faces the negative electrode plate, they are less high than the ribs on the front side and at least in part lie opposite these back to back. With the compression pressure that exists under the conditions of insertion, the compressibility of these separators is very low, it amounts to only about 1 to 2%, which is not sufficient to compensate for the above mentioned variations in thickness of the electrode plates and battery separators.

The basis object of the invention is thus to improve the aforementioned previously known starter-battery separator made from thermoplastic synthetic material as regards their compressibility and recovery force, in such a way that they are sufficient to compensate for the variations in thickness that occur, and yet to maintain constantly the necessary distance for the supply of acid without at the same time complicating manufacture and without impairing their life expectancy under normal conditions of use.

The subject of the invention is a starter-battery separator of the previously specified type of elastic synthetic material in which unlike in the previously known rib arrangement, the ribs on the rear side are each staggered as regards the ribs on the front side of the separator, so that a front-side rib runs between two rear-side ribs arranged as a pair or a rear-side rib runs between two front-side ribs arranged as a pair, such that the distance between two ribs arranged as a pair is considerably less than the distance between the neighbouring groups each formed of three associated ribs.

Preferably, each of the single ribs is situated in the middle between the ribs arranged in pairs on the other side. The single ribs on the front- or rear-side of the separator are preferably arranged at the same distances from each other so that an uneven distribution only results on the other side of the separator due to the paired arrangement of the ribs provided there, which previously was not known.

The extent of compressibility and recovery force of the separators according to the invention can be influenced in various ways. Firstly, it is possible to arrange an opposing pair for only some of the ribs on one side of the separator. The fewer opposing rib pairs there are, the less the pressure that has to be exerted to compress and deform the separator. Further, the separator sheet thickness may be increased between the pairs of ribs, i.e. opposite to the single ribs, in order to raise the recovery force.

Moreover, one can vary the distance apart of the ribs arranged in pairs. The compressibility increases and the recovery force decreases when the distance between the ribs of a pair is increased. With synthetic separators for starter batteries of the usual separator sheet thickness of 0.15 to 0.35 mm the distance apart of two ribs arranged as a pair, between which On the other side of the separator an opposing rib runs, amounts to about 1.2 to 4 mm (measured from rib centre to rib centre). It is particularly preferred for this distance to be about 2.5 mm and the distance of two neighbouring groups each of three associated ribs is approx. 13 mm (measured from rib centre to rib centre of the centre rib) when the separator sheet thickness is about 0.25 mm. The ratio between the distance apart of two ribs arranged in a pair and the distance apart of two neighbouring groups each of three associated ribs amounts advantageously to 1:2 to 1:11, preferably 1:4 to 1:6, and particularly 1:5.

The ribs on the front side are preferably high enough to give a thickness of about 1 mm with the separator sheet thickness, i.e. about 0.65 to 0.85 mm. The ribs on the rear side are lower with a height of 0.1 to 0.6 mm and preferably about 0.3 mm.

Battery separators of the present type are manufactured from polyethylene, polypropylene or polyvinylchloride with the addition of inorganic fillers such as amorphous silicic acid. Particularly preferred are battery separators made from polyethylene of high molecular weight, as produced on a large scale in practice.

Figure 2:
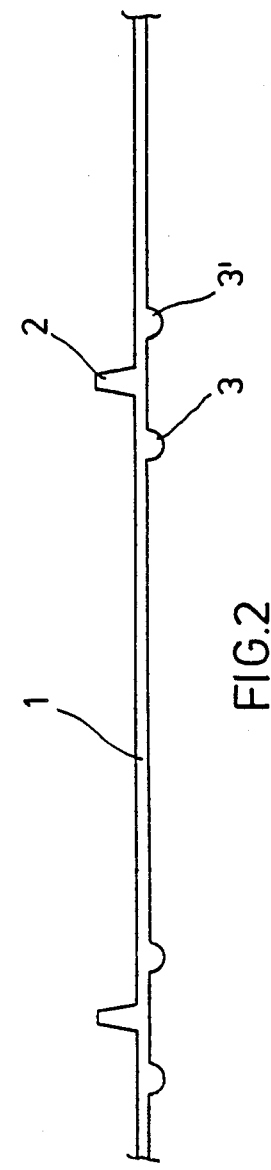
Figure 5:
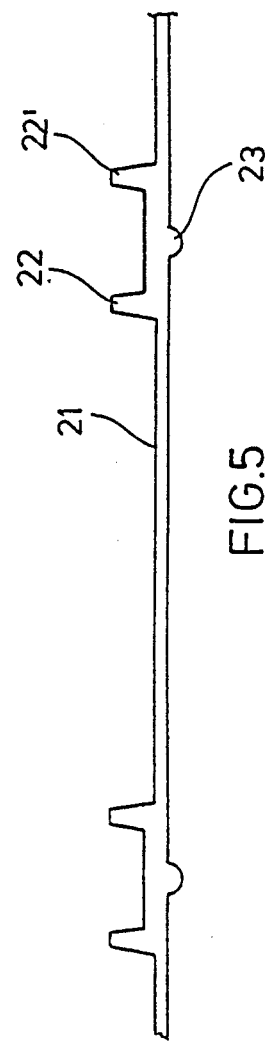

The accompanying drawings are intended to act as a more detailed explanation of the invention; they show FIG. 1 a separator according to the invention in cross-section, FIG. 2 a part of the cross-section of FIG. 1 enlarged in the ratio 5:1, FIG. 3 a different embodiment of the separator according to the invention, in cross-section, FIG. 4 a part of the cross-section of FIG. 3 enlarged in the ratio 5:1, FIG. 5 a further embodiment of the separator of the invention, in cross-section.

The separator according to the invention represented in cross-section in FIG. 1 consists of a separator sheet 1, of which the edge areas 4 are for bonding when heat or ultrasonics is applied, in the manufacture of pockets. On the front side of the separator ribs 2 are provided running at equal spacings. To each of these ribs 2 a pair of opposing ribs 3,3' is arranged on the rear side. As FIG. 2 shows, the ribs 2 each run in the centre of the opposing ribs 3,3' which are arranged in pairs. The ribs 2 on the front side of the separator, which are turned towards the positive electrode plate on assembly, are clearly higher than the opposed ribs 3,3'. It is consequently ensured that even when there is a certain deformation of the separator in the rib areas, such as occurs when the electrode pack is squeezed together, the separator sheet does not come into contact with the positive electrode plate and thus be destructively oxidized. FIG. 2 furthermore shows the preferred measurement ratios. With a separator sheet thickness of 0.25 mm the ribs 2 have a height of 0.75 mm and the ribs 3,3' a height of 0.3 mm, so that a total separator thickness of 1.3 mm results. The distance of the opposing ribs from each other (measured from rib centre to rib centre) is 2.5 mm, the distance between adjacent groups of three ribs (measured from rib centre to rib centre of the centre rib) is 13 mm; the ratio of the distances is consequently 1:5.2. The width of the ribs 2 and the opposing ribs 3,3' each measured at the foot of the rib is approx. 0.6 mm for each. As already explained above, the compressibility and elasticity of the separator can be influenced inter alia by the distance of the opposing ribs from each other. However a rib may never meet back to back with an opposing rib, because then the compressibility would be limited t that of the material, which is extremely low. It is only through the bending deformation that there results the necessary compressibility and elastic or recovery force with the separator according to the invention.

FIGS. 3 and 4 show another embodiment of the separator according to the invention, in which two ribs 12, 12' are arranged as a pair to an opposing rib 1. Here too the opposing rib 13 runs in the centre of the rib Pair 12, 12'. The size ratios are the same as for the embodiment in FIGS. 1 and 2.

In the embodiment of FIG. 5 the separator sheet thickness is increased in comparison to the area 21 outside of the ribs between the ribs 22, 22' arranged in pairs opposite to the single ribs 23; the increased thickness is 0.4 mm. A higher recovery force is obtained in this manner.

If desired, it is possible to provide further ribs in the intermediate spaces between the rib groups on the front and/or rear side of the separator without impairing the elastic deformation in the areas structured according to the invention. In particular with the additional ribs on the front side one can prevent the separator sheet coming into contact with the positive electrode plate. These additional ribs can also fulfil their purpose then when they have a smaller height than the other ribs provided on the front side.

The manufacture of the separators according to the invention can take place in the same manner as with conventional polyethylene separators. In these the synthetic substance which contains fillers is extruded through a slit and then fed through two calender rolls, by which means the ribs are produced and the separator sheet is reduced t the desired thickness. In the manufacture of a separator according to the FIGS. 1 and 2 the calender roll for the front side can remain unchanged from the prior art, for the rear side however a modified roll is necessary to produce the opposing ribs that are arranged in pairs.

Tests have shown that the separators according to the invention have the necessary compressibility and elasticity, to compensate for the variations of thickness of the electrode plates and separators occurring in manufacture. With these separators, manufactured plate packs can therefore be inserted without spacers into the battery containers; the plate packs are each then squeezed together to such an extent that they can be slid into the appropriate cell compartments and remain firmly clamped in them.

While the present invention has been described with reference to its preferred embodiments, it will be obvious to those skilled in the art that other variations and embodiments may be made and it is intended to cover such variations and embodiments in the appended claims.

What is claimed:

1. A battery separator comprising a sheet of elastic synthetic material, the sheet having a first side and a second side, the first side having a plurality of ribs arranged in pairs, the second side having a plurality ribs arranged as single, spaced apart ribs, the ribs on the second side being positioned between the pair of ribs on the first side so as to form a group of three associated ribs, the distance between each member of the pair of ribs on the first side being smaller than the distance between the adjacent groups of ribs.

2. The separator of claim 1 wherein the ribs of the second side run in the middle of the ribs arranged in pairs on the first side.

3. The separator of claim 1 wherein the single ribs on the second side are spaced apart at equal distances from each other.

4. The separator of claim 1 wherein the sheet has a thickness of about 0.15 to about 0.35 mm, the distance between the ribs arranged as a pair is from about 1.2 to about 4 mm (measured from rib center to rib center) and the distance between adjacent groups of ribs is about 13 mm (measured from rib center to rib center of the single rib in each group).

5. The separator of claim 1 wherein the ratio of distance between two ribs arranged as a pair on the first side and the distance between adjacent groups of ribs is from about 1:2 to about 1:11.

6. The separator of claim 5 wherein the ratio is from about 1:4 to about 1:6.

7. The separator of claim 6 wherein the ratio is about 1:5.

8. The separator of claim 1 wherein the ribs of the first side are of a height greater than the thickness of the separator sheet and the ribs of the second side are of a height less than the ribs of the first side.

9. The separator of claim 1 wherein the ribs of the second side are of a height greater than the thickness of the separator sheet and the ribs of the first side are of a height less than the ribs of the second side.

10. The separator of claim 1 wherein the first side faces a positive plate of a battery and the second side faces a negative plate of a battery.

11. The separator of claim 1 wherein the first side faces a negative plate of a battery and the second side faces a positive plate of a battery.

12. The separator of claim 1 wherein the sheet thickness between the pair of ribs on the first side is greater than the thickness of the sheet between the adjacent groups of ribs.

13. The separator of claim 1 wherein the elastic, synthetic material of the sheet is selected from the group consisting of polyethylene, polypropylene, polyvinyl chloride or mixtures thereof.

14. A battery separator comprising a sheet of elastic, synthetic material, the sheet having a front side and a back side, the front side having a series of ribs arranged in pairs, each rib of each pair being spaced apart from the other rib of the pair by a distance of from about 1.2 to 4 mm (measured from rib center to rib center), each pair of ribs being spaced from an adjacent pair of ribs by a distance of from about 2.4 to about 13 mm (measured from center of the pair to the center of the adjacent pair), the back side having a second series of ribs, the second series of ribs being arranged as single ribs, at least some of the single ribs are positioned on the back side so as to correspond to the space formed between each of the ribs which form a pair on the front side.

15. The separator of claim 14 wherein all of the single ribs arranged to run in the middle of the space formed between the ribs arranged as a pair.

16. The operator of claim 14 wherein the pairs of ribs are at equal distances from each other.

17. The separator of claim 14 wherein the single ribs are at equal distances from each other.

18. The separator of claim 14 wherein the height of the ribs on the front side is greater than the thickness of the sheet and the height of the ribs on the backside is less than the height of the ribs of the front side.

19. The separator of claim 14 wherein the height of the ribs of the back side is greater than the thickness of the sheet and the height of the ribs on the front side is less than the height of the ribs on the backside.

20. The separator of claim 14 wherein the thickness of the sheet is greater between each of the ribs which form a pair than the thickness of the sheet between adjacent pairs of ribs.

21. A separator comprising a sheet formed of an elastic synthetic material selected from the group consisting of polyethylene, polypropylene, polyvinyl chloride and mixtures thereof, the sheet having a thickness of about 0.15 to about 0.35 mm and solid ribs formed integrally on a front and rear side of the sheet, the ribs formed on the front side being of a height which is greater than the thickness of the sheet material and the ribs formed on the rear side being of a height smaller than the ribs of the front side, the ribs of the front side being arranged in a series of pairs having a space between each member of the pair of ribs that is less than the space between adjacent pairs of ribs, the rear side ribs being arranged as single ribs, at least some of which are aligned on the rear side so as to be in alignment with the space between the member of the pair of ribs on the front side.

22. The separator of claim 21 wherein the ratio of the distance between each member of a pair of ribs and the distance between adjacent pairs of ribs is from about 1:2 to about 1:11.

23. The separator of claim 21 wherein the thickness of the sheet in the space between the members of a pair of ribs is greater than the thickness of the sheet in the space between adjacent pairs of ribs.

24. The separator of claim 21 wherein all of the ribs of the rear side are in alignment with the space formed between the members of a pair of ribs on the front side.

25. A separator comprising a sheet formed of an elastic synthetic material selected from the group consisting of polyethylene, polypropylene, polyvinyl chloride and mixtures thereof, the sheet having a thickness of about 0.15 to about 0.35 mm and solid ribs formed integrally on a front and rear side of the sheet, the ribs formed on the front side being of a height which is greater than the thickness of the sheet material and the ribs formed on the rear side being of a height smaller than the ribs of the front side, the ribs of the front side being arranged in a series of pairs having a space between each member of the pair of ribs that is less than the space between adjacent pairs of ribs, the rear side ribs being arranged a single ribs, at least some of which are aligned on the rear side so as to be in alignment with the space between the member of the pair of ribs on the front side.

26. The separator of claim 25 wherein the ratio of the distance between each member of pair of ribs and the distance between adjacent pairs of ribs is from about 1:2 to about 1:11.

27. The separator of claim 25 wherein the thickness of the sheet in the space between the members of a pair of ribs is greater than the thickness of the sheet in the space between adjacent pairs of ribs.

28. A battery comprising a series of alternating positive and negative electrode plates, the positive and negative plates being essentially electrically isolated from each other by a battery separator, the battery separator being an elastic, synthetic sheet material having a front and rear side, a number of ribs being integrally formed on front side, the height of the ribs being greater than the thickness of the sheet, a number of ribs being integrally formed on the rear side, the of ribs of the rear side being less than the height of the ribs on the front side, the ribs of the separator being arranged so that a front side rib runs between two rear side ribs arranged in a pair and the distance bwtween the two rear side ribs arranged in a pair is less than the distance between adjacent pairs of ribs.

* * * * *